No. 701,272. Patented May 27, 1902.
W. NEIL.
AIR BRAKE CONNECTION.
(Application filed June 7, 1901.)
(No Model.)
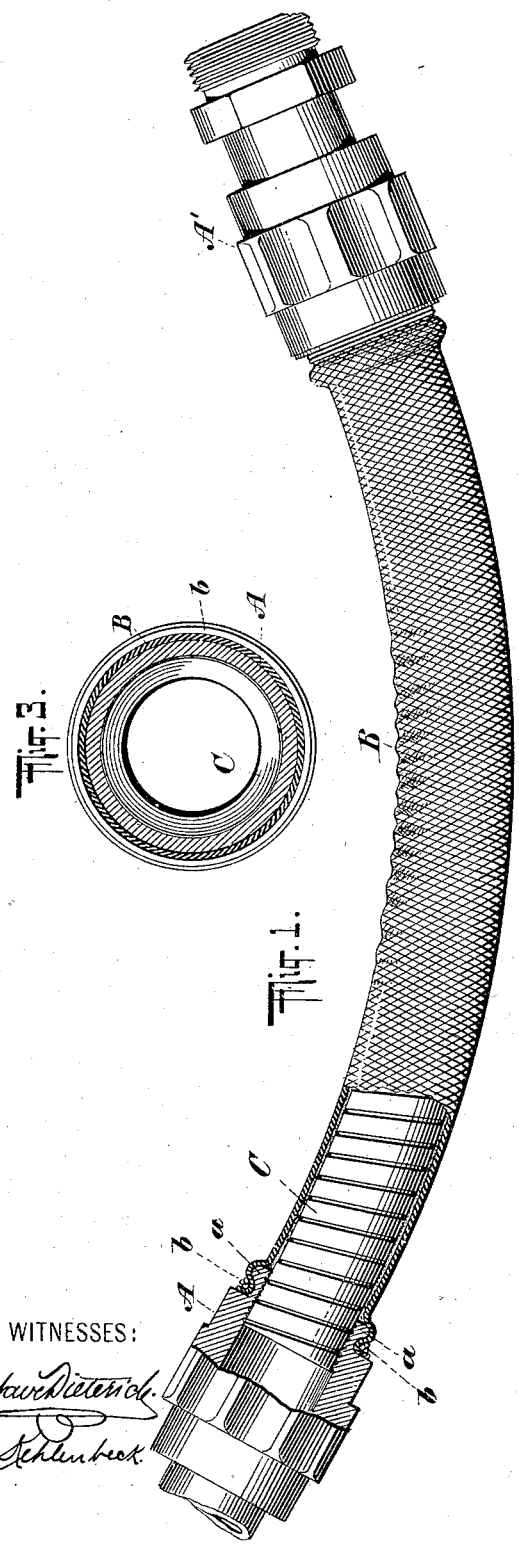
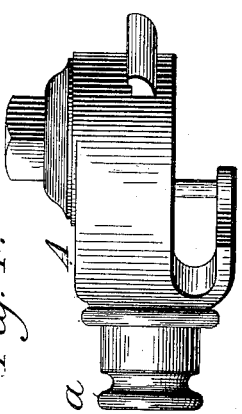
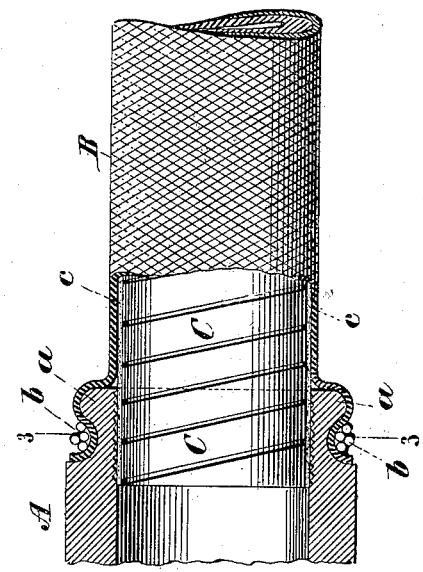
WITNESSES:
INVENTOR
William Neil
BY
J. Alexander Koones
ATTORNEY

UNITED STATES PATENT OFFICE.

WILLIAM NEIL, OF NEWARK, NEW JERSEY.

AIR-BRAKE CONNECTION.

SPECIFICATION forming part of Letters Patent No. 701,272, dated May 27, 1902.

Application filed June 7, 1901. Serial No. 63,601. (No model.)

*To all whom it may concern:*

Be it known that I, WILLIAM NEIL, a citizen of the United States, residing at the city of Newark, in the county of Essex and State of New Jersey, have invented new and useful Improvements in Air-Brake Connections, of which the following is a specification.

My invention relates to improvements in metal air-brake connections; and the object of my invention is to provide a metal connection for air-brakes used upon railroad-cars that will be flexible and impervious to moisture and capable of withstanding all pressures up to two hundred pounds.

In the accompanying drawings like letters in the different figures refer to like parts.

Figure 1 is a plan view of my improved connection, partly shown in section. Fig. 2 is an enlarged sectional view of one end of the connection. Fig. 3 is a vertical section across the line 3 3, and Fig. 4 is a representation of the coupling-head of ordinary construction.

C represents a flexible steel pipe or tube constructed spirally of one strip of metal double-seamed and made air-tight. $c$ represents a coating of paraffin; B, a casing of woven cloth or cotton hose.

A and A' are respectively the air-brake coupling-head and the air-brake pipe-coupling of usual constructions, and $b$ indicates the groove, and $a$ the beaded flange encircling the same.

The connections heretofore made and generally used for the purpose referred to consist of rubber tubing between the coupling-head and the pipe-coupling. This tubing has proved to be not durable and in winter weather to become extremely hard and brittle. In lieu of the rubber tubing or hose I have substituted a flexible spirally-made air-tight steel tube coated with paraffin and inclosed in a woven cotton hose or jacket, also saturated with paraffin. Without such protection the steel tubing would in moist weather become rusty, speedily become leaky, and cease to be effective, and in extremely cold and wet weather would become frozen stiff, so that it would not readily bend with the motion of the cars, and thereby become inoperative. I have sought by my improvements so to construct a connection as would insure its durability and working capacity in all kinds of weather and through all changes of temperature. To secure these qualities, I have designed a connection consisting of the flexible steel tube C, one end of which I screw into the metal air-brake coupling-head A and the other end into the air-brake pipe-coupling A', as shown in Figs. 1 and 2. These couplings are provided with a groove $b$ and the beaded flange $a$. In all other respects they are similar to the couplings now in use upon air-brake connections. The tubing C is then coated with paraffin alone or paraffin combined with some suitable vegetable oil. I then incase it in a cotton-web hose B or other suitable rubber or woven casing, which I connect with the couplings A and A' by drawing one end of the hose over the beaded flange $a$, so as to cover the groove $b$, and then binding it with copper wire wrapped around the hose in the groove $b$. This casing, I should explain, is made impervious to water by being saturated with paraffin alone or with paraffin combined with other vegetable oils. The ends of the casing and of the metal tubing may be connected with the metal couplings in any suitable manner other than those specified, and it will readily be understood that the union of the couplings and ends of the tubing must be made perfectly air-tight by soldering or brazing.

The casing B should be made slightly longer than the flexible tubing C between the couplings, so as to fit loosely and allow it to bend with the curving of the tubing without stretching or breaking. I may state here that the tubing which I prefer to use is the improved tubing of E. Levavasseur, upon which he secured Letters Patent No. 330,910 on November 24, 1885, although other suitable tubing may be used.

My couplings are designed to be used in the customary manner of connecting with rubber-hose connections the air-brake pipes and air-signal pipes extending under the floor and platforms of one car in a train with the similar pipes extending under the floor and platforms of the following car and are so constructed as readily to be attached to and detached from the end couplings of such pipes as are now generally in use and so as to avoid the necessity of modifying or changing the construction of such pipes and their end couplings.

If desired, the casing and steel tubing may be used without the paraffin coating between them. The hose or woven covering may be used without being saturated with paraffin or any other substance. I consider myself the first to substitute for the rubber hose in an air-brake connection an air-tight spiral steel tube coated and incased as aforesaid, and my improvements refer more particularly to such coating and incasing.

I do not claim air-brake couplings and air-tight spirally-made steel tubing combined alone or combined with a flexible lining or coating placed upon the inside surface of the tubing.

Having now described my invention, what I claim as new, and desire to secure by Letters Patent, is—

1. The combination in an air-brake connection of the air-brake couplings A and A', the spiral steel tubing C and the woven hose B saturated with paraffin, all constructed and combined substantially as hereinbefore described and shown.

2. The combination in an air-brake connection of the air-brake couplings A and A', the spiral steel tubing C coated with paraffin and the woven hose B saturated with paraffin, all constructed and combined substantially as hereinbefore described and shown.

3. The combination in an air-brake connection of the air-brake couplings A and A', the spiral steel tubing C and the woven hose B all constructed and combined substantially as hereinbefore described and shown.

Dated June 3, 1901.

WILLIAM NEIL.

Witnesses:
THOMAS G. BARRY,
J. ALEXANDER KOONES.